United States Patent
Seki et al.

[11] Patent Number: 5,805,134
[45] Date of Patent: Sep. 8, 1998

[54] METHOD AND APPARATUS OF DETECTING AND DISPLAYING ABNORMAL CONDITIONS UTILIZING A DISPLAY CONTROL APPARATUS

[75] Inventors: Hiroyuki Seki; Nobuhisa Kobayashi, both of Katsuta; Keisuke Bekki, Hitachi, all of Japan

[73] Assignee: Hitachi, Ltd., Tokyo, Japan

[21] Appl. No.: 607,190

[22] Filed: Feb. 26, 1996

Related U.S. Application Data

[63] Continuation of Ser. No. 79,873, Jun. 23, 1993, abandoned.

[30] Foreign Application Priority Data

Jun. 23, 1992 [JP] Japan .................................. 4-164960

[51] Int. Cl.$^6$ .............................. G08B 23/00; G09G 3/04
[52] U.S. Cl. .............................. 345/117; 345/33; 246/1 C
[58] Field of Search .......................... 395/788; 345/117, 345/23–26, 33, 141–143; 371/37.1, 53, 67.1; 340/506, 507, 509, 815.41, 815.44, 815.45, 815.53; 246/1 C

[56] References Cited

U.S. PATENT DOCUMENTS

| | | | |
|---|---|---|---|
| 1,764,687 | 6/1930 | Luce | 246/1 C |
| 1,890,122 | 12/1932 | Lavarack | 246/1 C |
| 2,217,526 | 10/1940 | Pelikan | 246/1 C |
| 2,424,696 | 7/1947 | Judge | 340/825.36 |
| 2,554,580 | 5/1951 | Le Goff | 340/815.43 |
| 3,110,020 | 11/1963 | Abendroth | 340/815.47 |
| 3,518,666 | 6/1970 | Heggestad | 340/815.43 |
| 3,800,139 | 3/1974 | Clark | 371/67.1 |
| 3,866,171 | 2/1975 | Loshbough | 371/67.1 |
| 4,096,989 | 6/1978 | Tawfik | 371/68.2 |
| 4,297,692 | 10/1981 | Maier | 345/117 |
| 4,301,450 | 11/1981 | Smoliar | 345/117 |
| 4,309,699 | 1/1982 | Tauer | 345/117 |
| 4,400,792 | 8/1983 | Strelow | 371/68.3 |
| 4,456,997 | 6/1984 | Spitza | 371/68.2 |
| 4,520,482 | 5/1985 | Fourre et al. | 371/68.3 |
| 4,581,605 | 4/1986 | Vogt | 345/117 |
| 4,601,021 | 7/1986 | Paul et al. | 345/117 |
| 4,734,687 | 3/1988 | Jones | 371/68.3 |
| 4,764,765 | 8/1988 | Shiff | 340/815.44 |
| 4,792,950 | 12/1988 | Volk et al. | 371/68.1 |
| 4,878,049 | 10/1989 | Ochiai et al. | 340/825.16 |
| 4,986,498 | 1/1991 | Rotter et al. | 246/1 C |
| 5,036,318 | 7/1991 | Bachhuber et al. | 340/825.16 |
| 5,153,886 | 10/1992 | Tuttle | 371/67.1 |
| 5,198,644 | 3/1993 | Pfeiffer et al. | 235/383 |
| 5,325,377 | 6/1994 | Tuttle | 371/67.1 |

FOREIGN PATENT DOCUMENTS

| | | |
|---|---|---|
| A2940551 | 4/1981 | Denmark . |
| A2265597 | 10/1975 | France . |
| A2149628 | 6/1985 | United Kingdom . |

*Primary Examiner*—Joseph R. Burwell
*Attorney, Agent, or Firm*—Antonelli, Terry, Stout, & Kraus, LLP

[57] ABSTRACT

A highly reliable display control apparatus and method suitable for use in a computer control system which is required to have high degree of reliability, such as control systems for railroad traffic or a nuclear power station. A meaningful symbol is divided into a plurality of sections and these sections are independently input to either one of the inputs of an interactive man-machine system through different systems so that these sections of the meaningful symbol are displayed in the same frame of the man-machine system, thus enabling the operator to visually detect any abnormality as to whether the displayed meaningful symbol is complete or not, whereby a high degree of reliability of the display is obtained.

2 Claims, 10 Drawing Sheets

FIG. 4

| CODE | CHARACTER PATTERN |
|---|---|
| 0001 | 1 (PATTERN OF UPPER HALF PART OF "1") |
| 0011 | 2 (PATTERN OF UPPER HALF PART OF "2") |
| 0101 | 3 (PATTERN OF UPPER HALF PART OF "3") |
| 0111 | 4 (PATTERN OF UPPER HALF PART OF "4") |
| 1001 | 5 (PATTERN OF UPPER HALF PART OF "5") |
| 1011 | 6 (PATTERN OF UPPER HALF PART OF "6") |
| 1101 | 7 (PATTERN OF UPPER HALF PART OF "7") |
| 1111 | 8 (PATTERN OF UPPER HALF PART OF "8") |

FIG. 5

| CODE | CHARACTER PATTERN |
|---|---|
| 1110 | 1 (PATTERN OF LOWER HALF PART OF "1") |
| 1100 | 2 (PATTERN OF LOWER HALF PART OF "2") |
| 1010 | 3 (PATTERN OF LOWER HALF PART OF "3") |
| 1000 | 4 (PATTERN OF LOWER HALF PART OF "4") |
| 0110 | 5 (PATTERN OF LOWER HALF PART OF "5") |
| 0100 | 6 (PATTERN OF LOWER HALF PART OF "6") |
| 0010 | 7 (PATTERN OF LOWER HALF PART OF "7") |
| 0000 | 8 (PATTERN OF LOWER HALF PART OF "8") |

0 0 0 0 ------ UPPER PART OF DISPLAY OF "0"  
1 1 1 1 ------ LOWER PART OF DISPLAY OF "0"
0 0 1 1 ------ UPPER PART OF DISPLAY OF "1"  
1 1 0 0 ------ LOWER PART OF DISPLAY OF "1"  
1 0 0 1 ------ UPPER PART OF DISPLAY OF "2"  
0 1 1 0 ------ LOWER PART OF DISPLAY OF "2"
0 1 0 1 ------ UPPER PART OF DISPLAY OF "3"  
1 0 1 0 ------ LOWER PART OF DISPLAY OF "3"

METHOD AND APPARATUS OF DETECTING AND DISPLAYING ABNORMAL CONDITIONS UTILIZING A DISPLAY CONTROL APPARATUS

This application is a continuation application of Ser. No. 08/079,873, filed Jun. 23, 1993, now abandoned.

BACKGROUND OF THE INVENTION

1. Field of the Invention

The present invention broadly relates to a computer control system which is required to operate with a high degree of reliability, such as a control system for route control of railroad trains or a control system for a nuclear power station and, more particularly, to a display apparatus and method suitable for use in such a computer control system.

2. Description of the Related Art

Nowadays, various systems are used in which control is performed by a control circuit and the result of the control is displayed on a display unit. In order to obtain a display output of high reliability, a method has been proposed and used in which a plurality of control circuits, processing or functions are provided, and the display output is produced after confirming that the plurality of control circuits, processings or functions provide the same result. For instance, Japanese Patent Laid-Open No. 58-52798 discloses the art in which the receiving system is provided with plural control circuits, processings or functions in order to improve the reliability. In this art, different systems are operated such that the signals on these systems are complementary to each other in regard to time, and the outputs from these systems are compared with each other by a comparator, thereby improving the reliability. Meanwhile, another reference (Sweden, ERICSSON REVIEW, No. 1,1986) discloses the art in which a plurality of programs are operated by a central processing unit, and the outputs of these programs are displayed on CRTs of receiving sections associated with these programs, so that the operator compares and checks the display contents. At the same time, U.S. Pat. No. 4,581,639 discloses the art which enables a plurality of phenomena to be displayed on a single CRT.

Improvement in the reliability can generally be achieved by multiplexing the control unit. The reliability of the whole system, however, is ruled by the reliability of the comparator means which compares the outputs from the plural control units. Thus, any attempt to improve reliability by multiplexing essentially requires a high degree of reliability of the comparison and checking means, such as a man-machine system, which compares and checks the outputs of the multiple units.

The above-mentioned art which employs visual comparison and check of the display on plural CRTs tends to lead to a reduction in the reliability due to overlooking or ignorance of display content on one or more CRTs. Continuous watching of plural CRTs requires a high level of concentration, which results in fatigue of the operator often impairing the reliability of the system.

SUMMARY OF THE INVENTION

Accordingly, an object of the present invention is to provide an interactive man-machine system which operates with a high degree of reliability.

To this end, according to the present invention, there is provided a display apparatus, comprising: display means having a divided display area function for dividing a meaningful symbol to be displayed into a plurality of sections and displaying these sections in different areas of the display, at least one of said sections being supplied to said display means through a system which is different from the system through which other sections are supplied.

The different systems may be provided by a multiplexed control system.

The different systems may be provided by a multiplexed transmission system.

The multiplexed control system may be a railroad train route control system.

The multiplexed control system may be a railroad train interlocking system.

The multiplexed transmission system may be a railroad control signal transmission system.

According to another aspect of the present invention, there is provided a display apparatus associated with a plurality of systems, comprising: means for displaying pieces of meaningful information from said systems on the same display frame, in such a manner that, when all said systems are safe, the displayed pieces of information in cooperation provide a pattern which forms a complete meaningful symbol on the display frame.

The plurality of systems may be provided by a multiplexed control system.

The plurality of systems may be provided by a multiplexed transmission system.

The present invention also provides a display method characterized in that a meaningful symbol is displayed as a combination of a plurality of patterns which are displayed in response to a plurality of functionally equivalent display control signals and which separately do not have any meaning.

The plurality of display control signals may be hamming codes.

According to the present invention having the features stated above, numerical information output from a control means is converted into a plurality of pieces of image information of different regions, and such plurality of pieces of image information are displayed at the respective regions of the same display frame, so that the operator can easily check the matching of the displayed pieces of image information with one another. Namely, the pattern displayed in each section has no meaning alone. Furthermore, any wrong combination of such patterns also is meaningless. Thus, the patterns displayed at different regions provide a definite meaning only when these patterns are correctly arranged. A meaningful pattern combination, i.e., a correctly arranged pattern, may be a character or a numeral which can easily be recognized by the operator. Thus, the operator can check whether the output from the control means is correct or not, by judging whether the cooperatively displayed patterns form a meaningful symbol such as a character or numeral.

Preferably, the same serial number is imparted to the data exchanged between a display control means and a control means. The operator can confirm that the control demand has been correctly input to the control means, by checking that the serial number imparted to the control demand and the serial number attached to the response from the control means are the same, as both of these serial numbers are displayed on the same display frame. It is therefore possible to prevent occurrence of serious accident which may otherwise be caused due to erroneous entry of a control demand, whereby a high degree of reliability is ensured.

The pattern codes which form the different parts of the meaningful symbol, e.g., upper and lower half parts, may be formed with different hamming codes, so that the image displayed on the display frame becomes meaningless when either one of these pattern codes is incorrect, thus indicating to the operator the occurrence of the trouble.

Trouble or error in the apparatus also is detected for the same reason, because different outputs are obtained from different systems of a multiplexed system so that an incomplete or deformed pattern is produced on the display.

Thus, according to the present invention, numeral information output from the control means is divided into a plurality of pieces of image information which are to be displayed at different image display areas, and these pieces of image information are displayed at the respective image display areas of the same image frame, so that any abnormality is detected by the pattern recognition ability of the operator, whereby an interactive man-machine system of a high reliability can be obtained.

The pattern codes for the display on the display frame are formed with different hamming codes. In the event of an error in either one of the pattern codes, image portions which do not correctly match with each other are displayed, so that the operator can easily recognize the occurrence of trouble in the data processing.

BRIEF DESCRIPTION OF THE DRAWINGS

FIG. 4 is an illustration of the construction of character pattern data shown in FIG. 2;

FIG. 5 is an illustration of the construction of character pattern data shown in FIG. 2;

DESCRIPTION OF THE PREFERRED EMBODIMENTS

Preferred embodiments of the present invention will be described with reference to the drawings.

First Embodiment

The description will begin with explanation of the construction of an embodiment.

Figure 1:
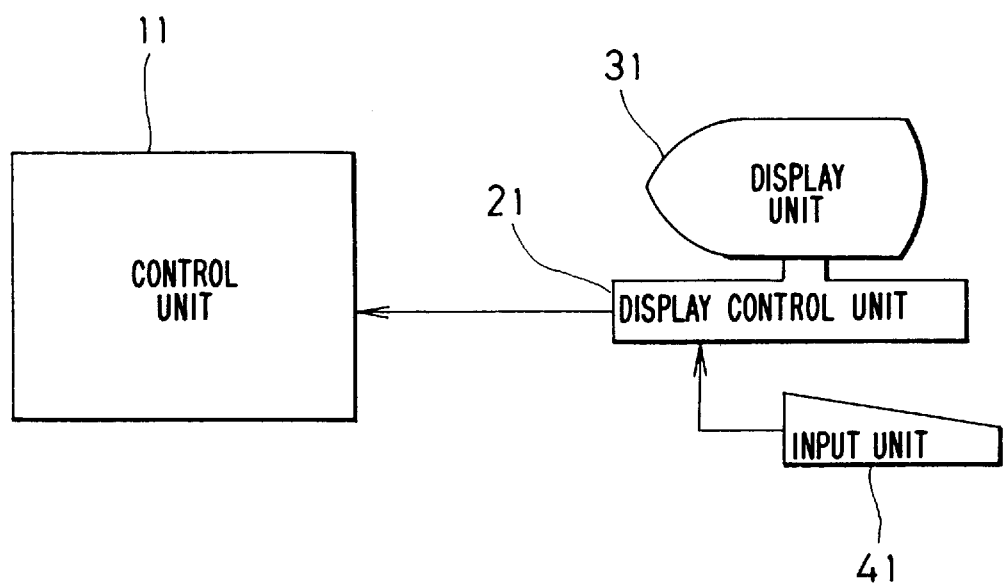
FIG. 1 is an illustration of the whole control system incorporating an embodiment of the display apparatus of the present invention.

FIG. 1 is an illustration of the whole control system incorporating a display apparatus embodying the present invention.

A control unit 11 operable with a high degree of reliability is disposed, as a rule, in a central computing center. A display control unit 21, a display unit 31 and an input unit 41 in cooperation form a man-machine system which is disposed at each local station. The communication line for transmitting data from the highly reliable control unit 11 to each display control unit 21 is constructed in conformity with the International Engineering Standards IE$^3$802.3 or IE$^3$802.4, and uses a coaxial cable as the transmission medium. Upon receipt of the data from the control unit 11, the display control unit 21 forms a display pattern which is then transmitted to the display unit 31 through an RGB cable or a coaxial cable, so that a pattern frame is displayed on the display unit 31. Control data demand is entered through the input unit 41.

Figure 2:
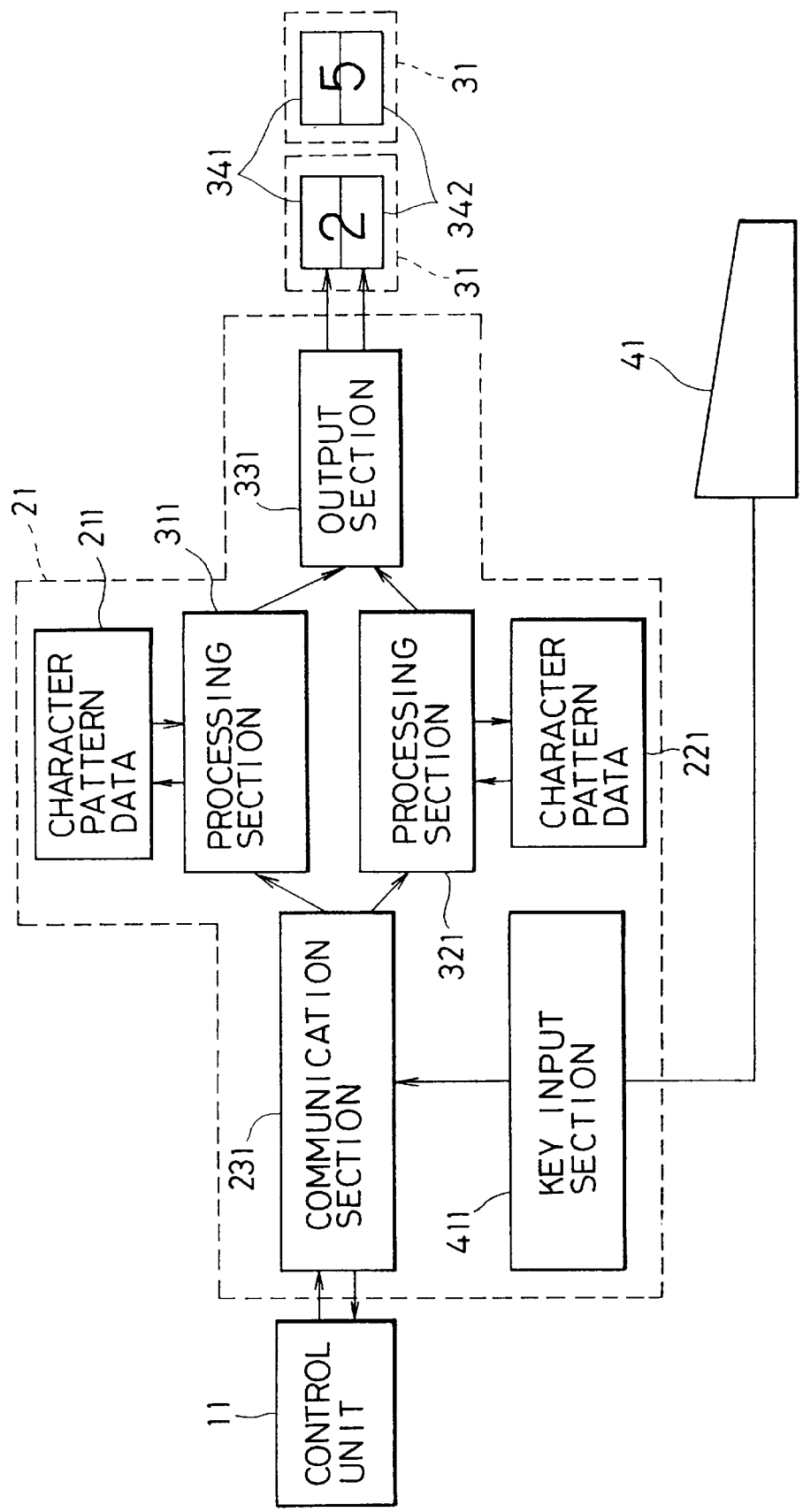
FIG. 2 is a block diagram illustrating the flow of data in the system shown in FIG. 1.
Figure 3:
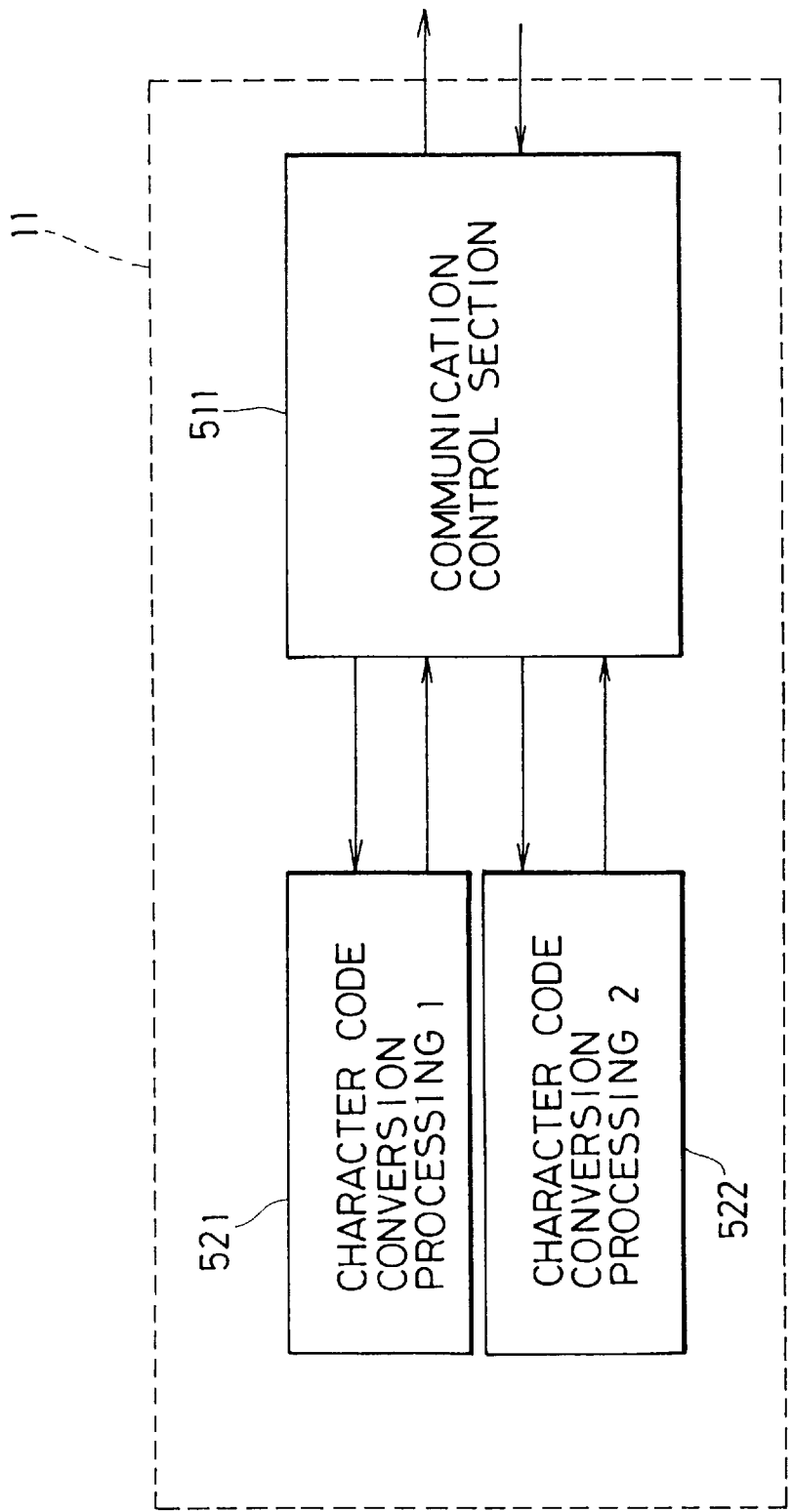
FIG. 3 is a block diagram illustrative of the content of the control section shown in FIG. 2.

FIG. 2 illustrates the flow of data in the system shown in FIG. 1, while FIG. 3 is a block diagram illustrative of the content of the control section shown in FIG. 2.

Assume here that a numeric character "2" is entered through the input unit 41. In response to the entry of the character "2", the key entry section 411 operates to convert the input character into 3-bit code "010" and transmits it to the communication section 231. The communication section 231 adds a 3-bit serial number to the coded data 010 which has been transmitted from the key entry section 411 and which corresponds to the character "2", and sends the data 010 with the serial number added thereto to the control unit 11. It is assumed here that the 3-bit serial number imparted thereto is "101". Thus, the following 6-bit data $D_1$ is delivered to the control section 11:

This 6-bit data is first received by the communication control section of the control unit 11, and is then delivered both to the character code conversion processing 1 and the character code conversion processing 2. The character code conversion processing 1 divides the data $D_1$ into the data portion and the serial number. In this case, the transmitted data $D_1$ is divided into the following data $C_1$ and the serial number $E_1$:

binary   decimal $C_1$=010=2 (data portion)

$E_1$=101=5 (serial number)

The character code conversion conversion processing 1 executes the following data conversion in the above-mentioned $C_1$ and $E_1$:

decimal   binary $F_1$=2×$C_1$−1=3=11 (data portion)

$G_1$=2×$E_1$−1=9=1001 (serial number)

The thus obtained data $F_1$ and $G_1$ are converted into 4-bit data, by the character code conversion processing 1, and combines these two 4-bit data thereby generating the following 8-bit data $H_1$:

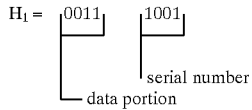

Furthermore, the character code conversion processing 1 adds 1-bit flag to lead 8-bit data $H_1$, in order to discriminate whether the data has been generated through the character code conversion processing 1 or through the character code conversion processing 2. In the illustrated embodiment, a discrimination flag "0" is given as the above-mentioned 1-bit flag when the data has been generated through the character code conversion processing 1, whereas, when the data has been obtained through the character code conversion processing 2, a discrimination flag "1" is given as the above-mentioned 1-bit flag. Consequently, the above-mentioned 8-bit data $H_1$ is converted into the following 9-bit data $H_1'$:

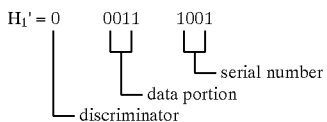

The data $H_1'$ is delivered to the display control section 21 via the communication control section 511.

The character code conversion processing 2 divides the transmitted data $D_1$ into the data portion and the serial number. In the illustrated embodiment, the data $D_1$ is divided into the following data $C_2$ and the serial number $E_2$:

binary decimal $C_2=010=2$ (data portion)

$E_2=101=5$ (serial number)

Subsequently, the character code conversion processing 2 executes the following data conversion processings on $C_2$ and $E_2$:

decimal binary $F_2=16-C_2<<1=12=1100$ $G_2=16-E_2<<1=6=110$

The term $G_2<<1$ indicates a processing which shifts $G_2$ to the left bit by one-bit.

The thus obtained data $F_2$ and $G_2$ are respectively converted into the following 4-bit data by the character code conversion processing 2, and these two 4-bit data are combined to form-the following 8-bit data $H_2$:

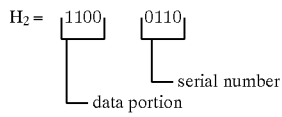

The character code conversion processing 2 adds to lead 8-bit data $H_2$ a discrimination flag "1" which indicates that the data has been generated through the character code conversion processing 2. Consequently, the above-mentioned 8-bit data is converted into the following 9-bit data $H_2'$:

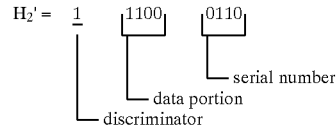

The 9-bit data $H_2'$ is delivered to the display control section 21 via the communication control section 511. The communication section 231 of the display control section 21 receives the pair of 9-bit data $H_1'$ and $H_2'$ which are generated in the control unit 11. The communication section 231 examines the lead bit, i.e., the discriminator, of the received data to examine whether the received data has been generated through the character code conversion processing 1 or through the character code conversion processing 2. If the data has been generated through the character code conversion processing 1, the communication section 231 transmits the data to the processing section 311. Conversely, if the data has been generated through the character code conversion processing 2, the communication section sends the data to the processing section 321.

Thus, the 9-bit data $H_1'$ and the 9-bit data $H_2'$, which are transmitted from the control unit 11, are respectively delivered to the processing section 311 and the processing section 321, through the communication section 231.

Upon receipt of the data $H_1'$, the processing section 311 extracts character pattern data which respectively correspond to the 4-bit code constituting the data portion and the 4-bit code constituting the serial number, from among plural character pattern data 211, and determines the positions where the extracted character patterns are to be displayed.

FIG. 4 shows the character patterns stored in the character pattern data 211. As will be seen from this figure, the character pattern data 211 contains patterns of upper half parts of numerals 1 to 8 and codes corresponding to these patterns. The processing section 311 examines the lead bit of $H_1'$ to check whether the data presently received is data which has been generated through the character code conversion processing 1 of the control unit 11. Then, the processing section 311 picks up the 4-bit code forming the data portion and extracts the character pattern corresponding to this 4-bit code from among the character pattern data 211.

In this case, "0011" is picked up as the code which forms the data portion, so that the pattern of the upper half part of the numeral "2" is extracted as the character pattern from among the character pattern data 211. At the same time, the position where this pattern is to be displayed as the data on the CRT frame is determined and delivered to the output section 331. Then, the 4-bit code representing the serial number portion of the data $H_1'$ is picked up, and character pattern corresponding to this 4-bit code is extracted from the character pattern data 211.

In this case, "1001" is picked up as the code representing the serial number, so that the pattern of the upper half part of the numeral "5" is extracted from the character pattern data 211 as the character pattern. At the same time, the position where this pattern is to be displayed as the serial number on the CRT frame is determined and delivered to the output section 331.

Upon receipt of the data $H_2'$, the processing section 321 extracts character pattern data which respectively correspond to the 4-bit code constituting the data portion and the 4-bit code constituting the serial number, from among plural character pattern data 221, and determines the positions where the extracted character patterns are to be displayed.

FIG. 5 shows the character patterns stored in the character pattern data 221. As will be seen from this figure, the character pattern data 221 contains patterns of lower half parts of numerals 1 to 8 and codes corresponding to these patterns. The processing section 321 examines the lead bit of $H_2'$ to check whether the data presently received is data which has been generated through the character code conversion processing 2 of the control unit 11. Then, the processing section 311 picks up the 4-bit code forming the data portion of $H_2'$ and extracts the character pattern corresponding to this 4-bit code from among the character pattern data 221.

In this case, "1100" is picked up as the code which forms the data portion, so that the pattern of the lower half part of the numeral "2" is extracted as the character pattern from among the character pattern data 221. At the same time, the position where this pattern is to be displayed as the data on the CRT frame is determined and delivered to the output section 331. Then, the 4-bit code representing the serial number portion of the data $H_2'$ is picked up, and character pattern corresponding to this 4-bit code is extracted from the character pattern data.

In this case, "0110" is picked up as the code representing the serial number, so that the pattern of the lower half part of the numeral "5" is extracted from the character pattern data 221 as the character pattern. At the same time, the position where this pattern is to be displayed as the serial number on the CRT frame is determined and delivered to the output section 331.

The output section 331 operates to cause the results of the processing respectively performed by the processing sections 311 and 321 to be displayed at predetermined locations on the display area of the display unit 31. In other words, the output section 331 performs a control of positions where RGB dots are to be displayed on an X-Y coordinate of the frame of the CRT of the display unit 31. The codes used for the extraction of the character pattern in the processing section 311 and the codes used for the extraction of the character pattern in the processing section 321 are determined at large hamming distances from each other, in order that upper and lower half parts of the same character are not erroneously selected simultaneously due to error in plural bits in each processing. When the character patterns are displayed on the display frame at the display areas for the processing sections 311 and 321, respectively, if the upper half part and the lower half part of the character "2" are displayed at right positions, the patterns 341 and 342 displayed on the display unit 31 are visually recognized as being a complete one character "2". The display unit 31 need not be a CRT but may be of any type of display device which can display dots. Thus, the display unit 31 may be composed of a liquid crystal display panel, but is not allowed to have any logic, unlike other components.

If the processing section 321 has failed and erroneously selected a different pattern, e.g., "4" and delivered it to the display unit 31, the upper half pattern 341 forms upper half part of "2", while the lower half pattern 342 forms the lower half part of "4" on the display screen, thus informing the operator that a failure has occurred either in the processing section 311 or the processing section 321. Similarly, when the processing section 321 has erroneously selected a pattern of an unidentified code other than that of "2" due to trouble and delivered it to the display unit 31, the upper half pattern 341 forms the upper half part of "2", whereas no pattern is formed at the location of the lower half pattern 342. Consequently, an incomplete pattern is displayed on the display unit 31, thus informing the operator of the occurrence of trouble in either one of the processing sections. In the described embodiment, occurrence of a failure or trouble can easily be detected by a visual check by the operator, thus eliminating the necessity of the comparator means which hitherto has been necessary for the purpose of comparing outputs of different systems in order to ensure reliability of the display.

Figure 6:
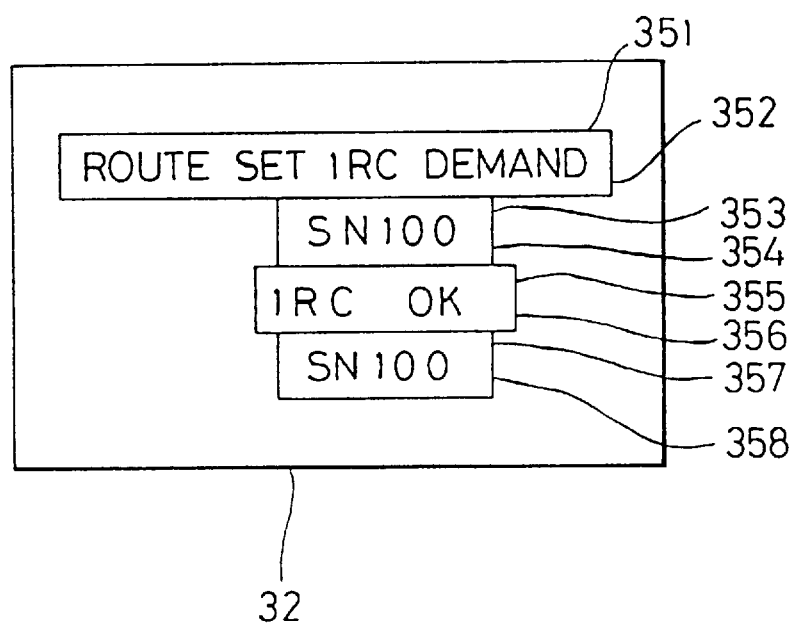
FIG. 6 is an illustration of a frame on the display section of the embodiment of the present invention.

FIG. 6 illustrates a pattern on a frame 32 displayed on the display unit 31.

When "ROUTE SET 1RC DEMAND" is entered through the input unit 41, the entered demand is sent to the highly reliable control unit 11 through the key entry section 411 and via the communication section 231. Data is formed in duplicate by the control unit 11, with a serial number imparted to both of them. The duplicate data with the same serial number are delivered to the respective processing sections 311 and 312. The processing section 311 operates to display the upper half parts 351, 353, while the processing section 321 operates to display lower half parts 352, 354, on the display unit 31, whereby messages "ROUTE SET 1RC DEMAND" and "SN 100" are displayed on the display unit 31.

When a message "1RC OK" is to be given by the control unit 11 in response to the "ROUTE SET 1RC DEMAND", the control unit 11 forms data of "1RC OK" with the serial number which is the same as that of the input, i.e., "SN 100", and delivers thus formed data to the communication section 231 together with the serial number. The data and the serial number are then supplied to each of two processing sections 311 and 321. The processing section 311 then forms upper half parts 355, 357 of the messages, while the processing section 321 form the lower half parts 356, 358, whereby messages "1RC OK" and "SN 100" are displayed on the display unit 31. Since this response bears the same serial number "SN 100" as the input demand, the operator can confirm that the displayed messages are the correct response to the input demand. Thus, a highly reliable display information can be obtained by using the principle explained before in connection with FIGS. 1 and 2.

It is assumed here that, due to trouble occurring in the output section 331, a response to a preceding input (serial number "SN 099") has been erroneously output. Since the data supplied from the highly reliable control unit 11 to the communication section 231 bears the serial number "SN100", the display unit 31 displays both "ROUTE SET 1RC DEMAND", "SN 100" and "1RC OK", "SN099", so that the operator can recognize that the displayed message is not the correct response to the presently entered demand, based on the difference in the serial number.

Figure 7:
FIG. 7 is an illustration of a pattern code on the frame of the display as obtained when a hamming code is separated.
Figure 7:
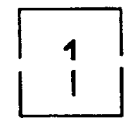
Figure 7:
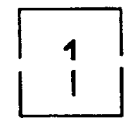
Figure 7:
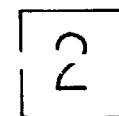
Figure 7:
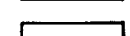
Figure 7:
Figure 7:
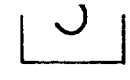

FIG. 7 illustrates patterns as obtained when the pattern codes are formed by different codes of a large hamming distance from each other.

An error in the bits constituting a code during data processing, even a one-bit error, produces such an effect that the code including the error is different from the correct code which would have been obtained if there were no bit error. Consequently, patterns formed by upper and lower half parts are deformed on the display, thus enabling a clear indication of occurrence of the bit error. The pattern codes to which the processing sections of the display control unit 21 refer are character display codes formed of different codes as illustrated in FIG. 7. The pattern codes referred to by plural programs in the display control section 21 also are formed of different codes, thus ensuring high degree of reliability and safety.

In the first embodiment as described hereinbefore, a single processor of the control unit 11 for controlling, for example, a plant executes two different character code conversion processings 1 and 2 which form different systems, and any failure or trouble in the processor is detected through observation of the results of these processings on the display.

In general, control devices for control objects which require specifically a high degree of reliability are usually multiplexed. As stated before, it is extremely difficult for the operator to find any failure occurring in one of such duplex systems simply by monitoring the displays connected to the respective systems.

Second Embodiment

In a second embodiment described hereinunder, a meaningful symbol or character is divided into a plurality of sections which are correlated to respective systems of the multiplexed control. When all the systems are safe, the sections corresponding to the systems are correctly displayed on the respective designated positions so as to complete the meaningful symbol. Thus, when failure has occurred in one or more systems, the meaningful symbol is not completed on the display, so that the operator can easily recognize the occurrence of the failure.

Figure 8:
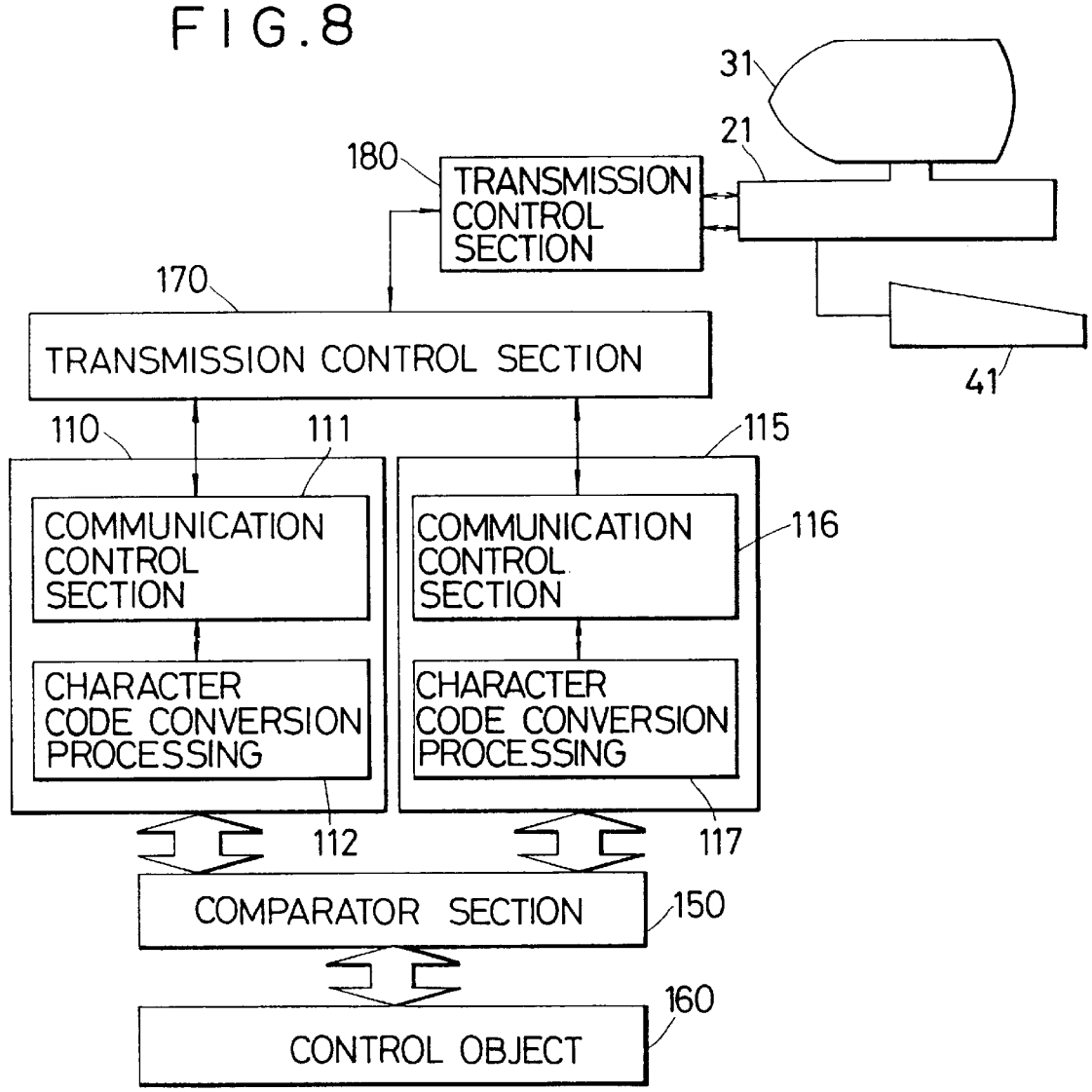
FIG. 8 is a block diagram showing the whole construction of a control unit in a different embodiment of the present invention.

FIG. 8 is a block diagram showing the whole construction of a control device in accordance with the second embodiment. In this embodiment, the control device is duplexed so that it has a pair of control systems 110 and 115. These control systems 110 and 115 are internally equipped with communication control sections 111 and 116 and character code conversion processings 112 and 117, and execute an identical processing on a common control object 160. A comparator section 150 compares the results of the processings performed by the control systems 110 and 115 with each other and delivers the result to the control object 160. The control object 160 controls various devices in accordance with the instructions given by the comparator 150.

When a demand has occurred for displaying information on a display unit 31, the control systems 110 and 115 execute conversion of the information into character codes through the same process as that used in the first embodiment, and send serial data to the display control unit 21 via communication control sections 111, 116 and transmission control sections 170, 180. The display control unit 21 performs conversion of the character codes into patterns in the same manner as that in the preceding embodiment, thereby causing these patterns to be displayed at respective positions on the display frame.

The character code processings 112 and 117 may employ different conversion programs, although they may use an identical program for conversion.

Although the second embodiment as described employs a duplex control device, this is only illustrative and the second embodiment can be modified to perform the described display control for triplex or quadruplex control device.

Third Embodiment

Figure 9:
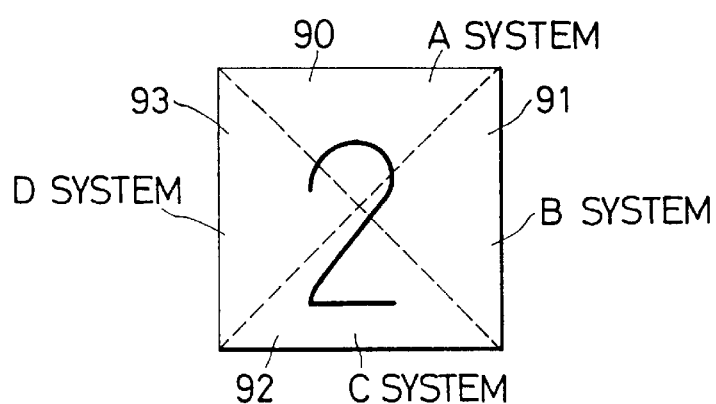
FIG. 9 is an illustration of a pattern displayed on a display unit of a different embodiment of the present invention.

FIG. 9 illustrates the pattern displayed on a display section of a third embodiment. In this case, the control device is quadruplex: namely, it has four systems SYSTEM A, SYSTEM B, SYSTEM C and SYSTEM D. When a meaningful symbol, e.g., numeral; "2" is to be displayed, the area of display of this symbol "2" is divided into four regions 90, 91, 92 and 93, and display at these regions are controlled, respectively, by SYSTEM A, SYSTEM B, SYSTEM C and SYSTEM D.

In this embodiment, when any one of the quadruplex systems fails, the meaningful pattern combination is not completed on the display, so that the operator can easily recognize the occurrence of a failure.

In the embodiments described hereinbefore, occurrence of failure in the control section is easily detected by the operator who monitors the display. The invention, however, can be applied also to such a system that the reliability of the transmission system is low although the control section has a sufficiently high reliability. A different embodiment, which is applied to such a system, will be described hereinunder.

Fourth Embodiment

Figure 10:
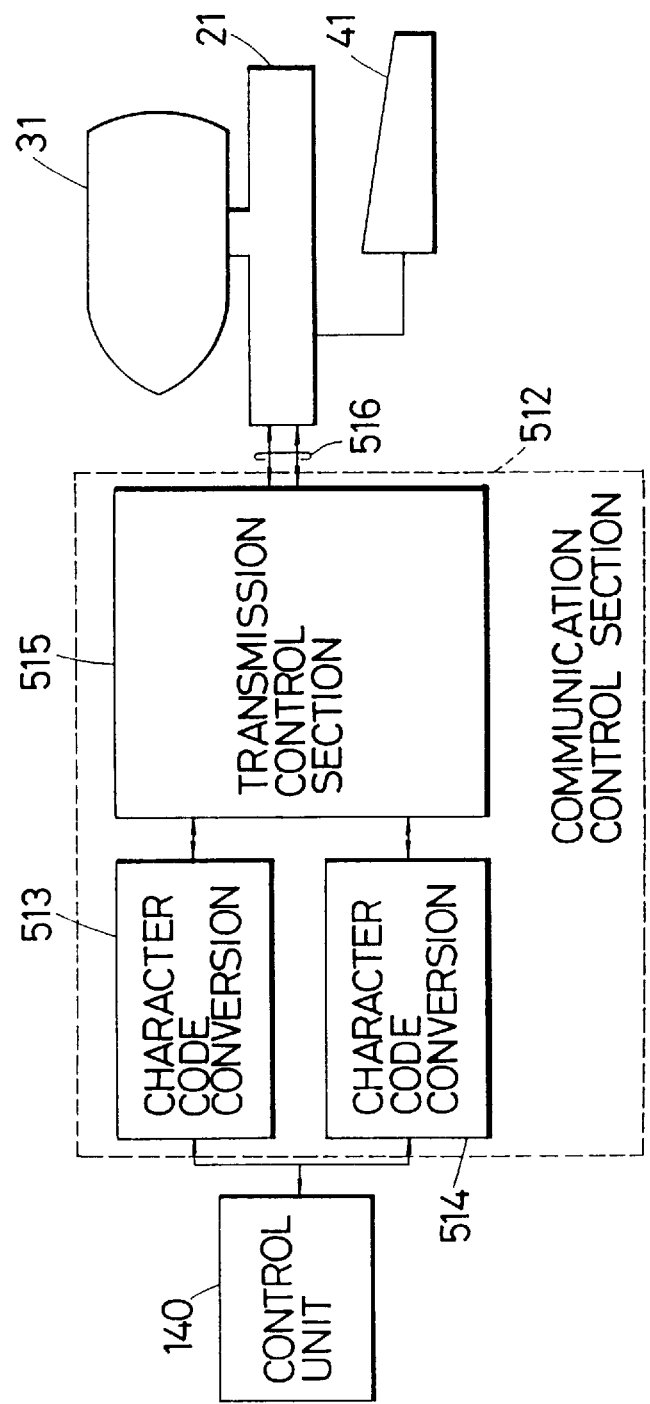
FIG. 10 is a block diagram showing the whole construction of a communication control section in an embodiment of the present invention.

FIG. 10 is a block diagram showing the construction of the communication control section employed in a fourth embodiment of the present invention.

In this embodiment, the communication control section 512 has character code conversion sections 513, 514 and a transmission control section 515.

When a demand has occurred in the control unit 140 for displaying information, the information is supplied to the communication control section 512 and then to the character code conversion sections 513, 514. Thus, these sections 513, 514 receive identical information. These character code conversion sections 513 and 514 perform character code conversions in the same manner as that described before. For instance, the character code conversion section 513 converts the information into codes for displaying upper half part of a meaningful symbol, while the character code conversion section 514 converts the information into codes for displaying lower half part of the meaningful symbol. The codes thus obtained through conversion are delivered to the transmission control section 515. The transmission control section 515 transmits the codes to the display control unit 21 through different transmission paths 516. The display control unit 21 then conducts a processing similar to that described before, and delivers signals corresponding to the sections of the meaningful symbol to the display unit 31.

In this embodiment, when a failure has occurred in either one of the transmission paths, the display of the meaningful symbol on the display unit 31 is not completed, so that the operator can easily recognize the occurrence of trouble in either one of the transmission paths.

In the first embodiment described before, the input character information is sent to the control section which produce character codes of the respective sections or regions of the character to be displayed, and these characters are synthesized into a meaningful symbol by the display control unit. Therefore, in the event of occurrence of trouble or failure in the processor of the control section, upper and lower halves of a symbol or symbols different from the entered symbol are displayed, making it impossible to check up the character or symbol recognized by the control section with the actually entered character or symbol.

Fifth Embodiment

Figure 11:
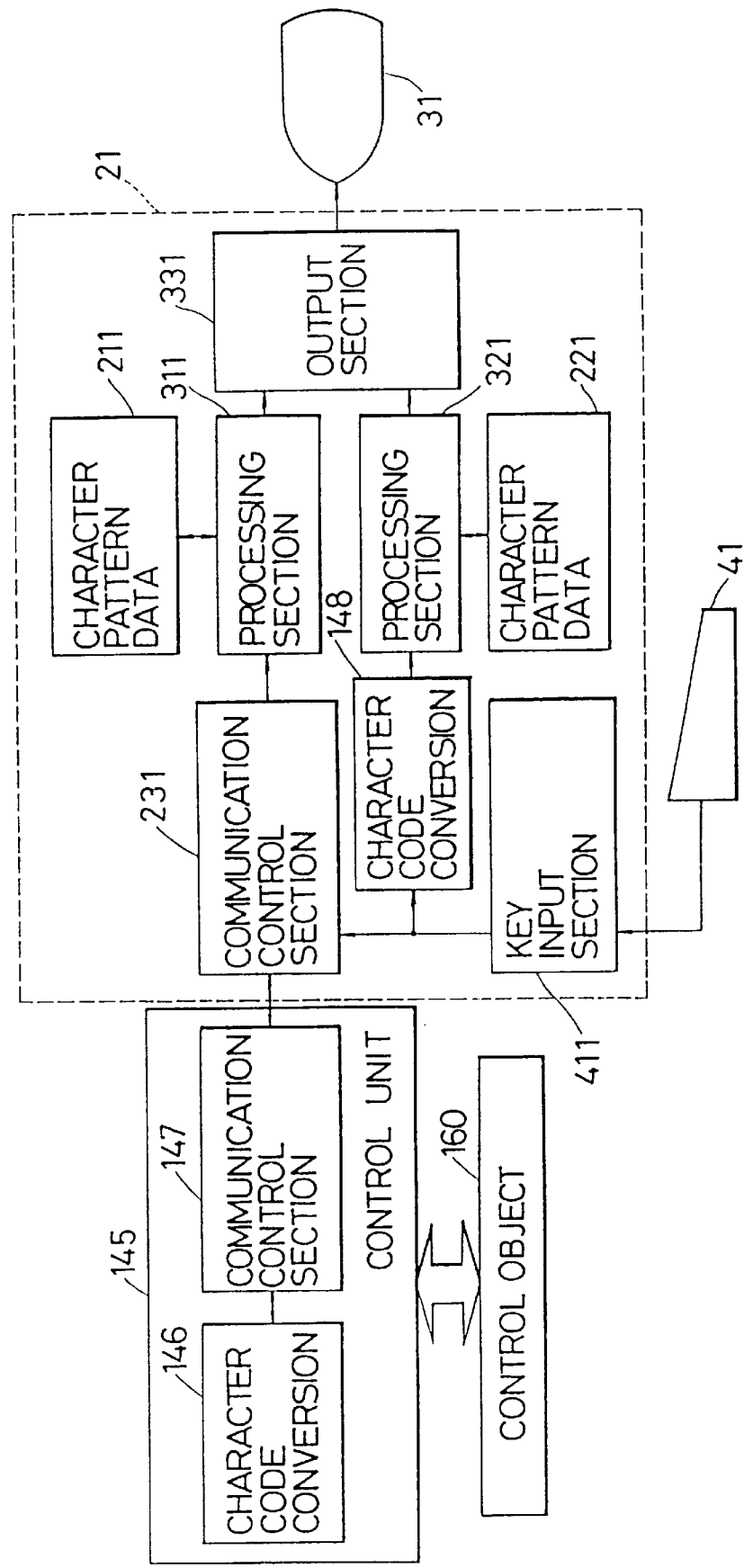
FIG. 11 is a block diagram showing the whole construction of a control unit in a different embodiment of the present invention.

FIG. 11 is a block diagram showing the whole construction of the control device in a fifth embodiment of the present invention.

In this embodiment, half of a character entered through the key is directly displayed, while the remaining half is displayed through the processor of the control device.

A part of a character, e.g., lower half, of the symbol entered through the keyboard 41 is converted into codes by the character code conversion section 148 of the display control unit 21, and the thus-obtained codes are delivered to the display unit 31 via the processing section 321 and the output section 331. Meanwhile, the entered character information is input to the character code conversion 146 of the processor of the control unit 145 and is converted into character codes. These character codes are delivered to the processing section 311 through the communication control section to form data corresponding to the upper half of the entered character, and this data is delivered to the display unit 31 through the output control section 331.

This embodiment enables at-a-glance check as to whether the character information recognized by the control unit coincides with the character information entered through the keyboard.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A method of detecting and displaying abnormal conditions in a display control apparatus, said method comprising the steps of:

dividing a pattern of either of a character or a numeral to be displayed on a display screen into a plurality of sections;

inputting each of said sections of said divided pattern through respectively corresponding control systems of said display control apparatus;

systematically recombining said sections of said divided patterns and displaying said sections as a reconstructed character or numeral of the original character or numeral; and enabling an operator to visually detect abnormalities in said display control apparatus based on the displayed reconstructed character or numeral.

2. A display control apparatus, comprising:

means for dividing a pattern of either of a character or numeral to be displayed on a display screen into a plurality of sections;

means for inputting each of said sections of said divided pattern through respectively corresponding control systems of said display control apparatus;

means for systematically recombining said sections of said divided pattern and displaying said sections as a reconstructed character or numeral of the original character or numeral; and means for enabling an operator to visually detect abnormalities in said display control apparatus based on the displayed reconstructed character or numeral.

* * * * *